US012798280B2

(12) United States Patent

Koh et al.

(10) Patent No.: US 12,798,280 B2
(45) Date of Patent: Nov. 17, 2026

(54) PAPER TRAY STORAGE SYSTEM

(71) Applicant: ASKOH.COM LLC, Los Alamos, NM (US)

(72) Inventors: Aik-Siong Koh, Los Alamos, NM (US); Asher Fu-Yi Koh, Los Alamos, NM (US)

(73) Assignee: ASKOH.COM LLC, Los Alamos, NM (US)

(*) Notice: Subject to any disclaimer, the term of this patent is extended or adjusted under 35 U.S.C. 154(b) by 0 days.

(21) Appl. No.: 18/906,443

(22) Filed: Oct. 4, 2024

(65) Prior Publication Data

US 2026/0097608 A1 Apr. 9, 2026

(51) Int. Cl.
*B42F 7/10* (2006.01)

(52) U.S. Cl.
CPC .................................... *B42F 7/10* (2013.01)

(58) Field of Classification Search
CPC . B42F 7/10; A47B 65/15; A47B 63/00; A47F 7/147
USPC ........................................... 206/449; D19/90
See application file for complete search history.

(56) References Cited

U.S. PATENT DOCUMENTS

| | | | | | |
|---|---|---|---|---|---|
| D129,374 | S | * | 9/1941 | Guild | D19/90 |
| D186,672 | S | * | 11/1959 | Gilruth | D19/92 |
| D209,681 | S | * | 12/1967 | Lyman | D6/407 |
| 3,592,344 | A | * | 7/1971 | Schade | B42F 7/145 229/164 |
| 3,612,637 | A | * | 10/1971 | Betts | A47B 63/00 206/561 |
| 3,759,395 | A | * | 9/1973 | Juhlin | A47B 63/00 211/11 |
| 4,034,864 | A | | 7/1977 | Tyson et al. | |
| 4,684,027 | A | * | 8/1987 | Wright | G11B 23/0236 |
| 4,796,761 | A | * | 1/1989 | Hermelin | B42F 17/02 211/11 |
| 4,819,802 | A | * | 4/1989 | Gutierrez | G11B 33/0455 221/87 |
| 4,909,398 | A | * | 3/1990 | Santucci | A47F 7/147 211/11 |
| D309,066 | S | * | 7/1990 | Foran | D6/683 |
| 4,944,412 | A | * | 7/1990 | Daigre | B42F 17/08 211/11 |
| 4,967,915 | A | * | 11/1990 | Robson | A47B 81/068 211/41.12 |
| 5,005,709 | A | | 4/1991 | Stokes | |
| 5,411,145 | A | * | 5/1995 | Parks | A47B 63/00 D6/683 |
| 5,415,298 | A | * | 5/1995 | Callahan | G11B 33/0416 211/40 |
| 5,470,141 | A | | 11/1995 | Billingham | |
| 5,779,331 | A | | 7/1998 | Fox et al. | |
| D400,926 | S | * | 11/1998 | Stravitz | D6/683 |

(Continued)

*Primary Examiner* — Ernesto A Grano
(74) *Attorney, Agent, or Firm* — Kameron W. Kramer

(57) ABSTRACT

A paper tray storage system including one or more file inserts and a stand. The paper tray storage system of the present invention allows for papers and other objects of various sizes to be stored properly, while allowing for expandability of storage and for removability of the file inserts. The stand has a series of vertical walls that form a V shape, which the file insert is disposed on. The vertical walls of the stand form compartments. The file insert is easily removed and portable.

16 Claims, 16 Drawing Sheets

(56) References Cited

U.S. PATENT DOCUMENTS

| | | | | | |
|---|---|---|---|---|---|
| 6,082,553 | A * | 7/2000 | Stravitz | A47B 63/00 | |
| | | | | 312/9.9 | |
| 6,129,219 | A * | 10/2000 | Peickert | A47B 45/00 | |
| | | | | 211/74 | |
| 6,161,704 | A * | 12/2000 | Stravitz | B42F 17/02 | |
| | | | | 211/189 | |
| 6,164,461 | A * | 12/2000 | Ward | G11B 33/0461 | |
| | | | | 211/40 | |
| D439,279 | S * | 3/2001 | McColskey | D19/86 | |
| 6,227,384 | B1 * | 5/2001 | Saylor | A47B 17/033 | |
| | | | | 211/11 | |
| 6,332,546 | B1 * | 12/2001 | Hunt | B42F 17/08 | |
| | | | | 211/41.12 | |
| D485,466 | S * | 1/2004 | Haruhiro | D6/629 | |
| D498,263 | S * | 11/2004 | Goodman | D19/91 | |
| D502,741 | S * | 3/2005 | Bain | D19/86 | |
| D510,600 | S * | 10/2005 | Benn | D19/78 | |
| D550,285 | S * | 9/2007 | Theodorides | D19/90 | |
| D580,991 | S * | 11/2008 | Smith | D19/91 | |
| 7,510,089 | B2 * | 3/2009 | Killinger | B42F 7/145 | |
| | | | | 211/11 | |
| D616,027 | S * | 5/2010 | Snyder | D19/86 | |
| D633,731 | S * | 3/2011 | Pohl | D6/675.3 | |
| D645,081 | S * | 9/2011 | Cohen | D19/90 | |
| D646,722 | S * | 10/2011 | Chuang | D19/90 | |
| 8,281,927 | B2 * | 10/2012 | Smith | B65D 5/5021 | |
| | | | | 229/120.21 | |
| D678,947 | S * | 3/2013 | Stravitz | D19/78 | |
| D679,329 | S * | 4/2013 | Stravitz | D19/90 | |
| 8,684,193 | B1 * | 4/2014 | Sharon | B65D 5/0227 | |
| | | | | 211/94.01 | |
| D708,258 | S * | 7/2014 | Lee | D19/90 | |
| D712,475 | S * | 9/2014 | Scott | D19/90 | |
| D712,476 | S * | 9/2014 | Scott | D19/90 | |
| 9,439,520 | B2 * | 9/2016 | Berry | A47F 5/0018 | |
| 9,782,996 | B1 | 10/2017 | Kuo | | |
| 10,357,119 | B2 * | 7/2019 | Kalm | A47F 5/105 | |
| 10,398,243 | B2 * | 9/2019 | Sedgwick | A47G 19/30 | |
| D898,116 | S * | 10/2020 | Snell | D19/90 | |
| 11,072,198 | B1 | 7/2021 | Savryha et al. | | |
| D957,198 | S * | 7/2022 | Ye | D7/600.1 | |
| D965,681 | S * | 10/2022 | Yao | D19/75 | |
| D974,467 | S * | 1/2023 | Seifert | D19/90 | |
| D992,639 | S * | 7/2023 | Romanov | D19/90 | |
| D993,717 | S * | 8/2023 | Nathan | D7/601 | |
| D996,520 | S * | 8/2023 | Hunt | D19/90 | |
| D1,001,888 | S * | 10/2023 | Seifert | D19/90 | |
| 12,082,692 | B1 * | 9/2024 | Chen | A47F 5/005 | |
| 12,220,088 | B2 * | 2/2025 | Guild | A47J 47/16 | |
| D1,073,792 | S * | 5/2025 | Jiang | D19/91 | |
| D1,090,131 | S * | 8/2025 | Nathan | D3/313 | |
| 2005/0218092 | A1 * | 10/2005 | Rosen | A47F 5/0006 | |
| | | | | 211/10 | |
| 2005/0230330 | A1 * | 10/2005 | Killinger | B42F 17/06 | |
| | | | | 211/11 | |
| 2020/0102135 | A1 * | 4/2020 | Reinhart | B65D 1/22 | |
| 2021/0100403 | A1 * | 4/2021 | Nathan | A47J 47/16 | |
| 2022/0402653 | A1 * | 12/2022 | Nathan | A47J 47/16 | |

* cited by examiner

PAPER TRAY STORAGE SYSTEM

TECHNICAL FIELD

The present invention relates to a paper tray, and more specifically, to a paper tray storage system with removable file compartments.

PRIOR ART

Paper trays and other desk organizers are abundant in the prior art. There are paper trays that store paper vertically, horizontally, in folders, with dividers, etc. However, the storage being offered by the most of the prior art paper trays do not allow any versatility based on the desired usage. A user essentially needs to purchase a paper tray based on exactly what they are looking for, or as close to it as possible, and they are stuck with the tray.

There exists a need for a paper tray that offers some level of versatility. The present invention overcomes the shortcomings contained in the prior art by providing a paper tray storage system that provides for flexibility as a user's needs change.

SUMMARY OF THE INVENTION

The present invention provides a paper tray storage system that allows for flexibility of use. The present invention allows for papers of various sizes to be stored properly, while allowing for expandability of storage.

Certain embodiments of the invention have other steps or elements in addition to or in place of those mentioned above. The steps or element will become apparent to those skilled in the art from a reading of the following detailed description when taken with reference to the accompanying figures, if any.

DETAILED DESCRIPTION OF THE INVENTION

Figure 1:
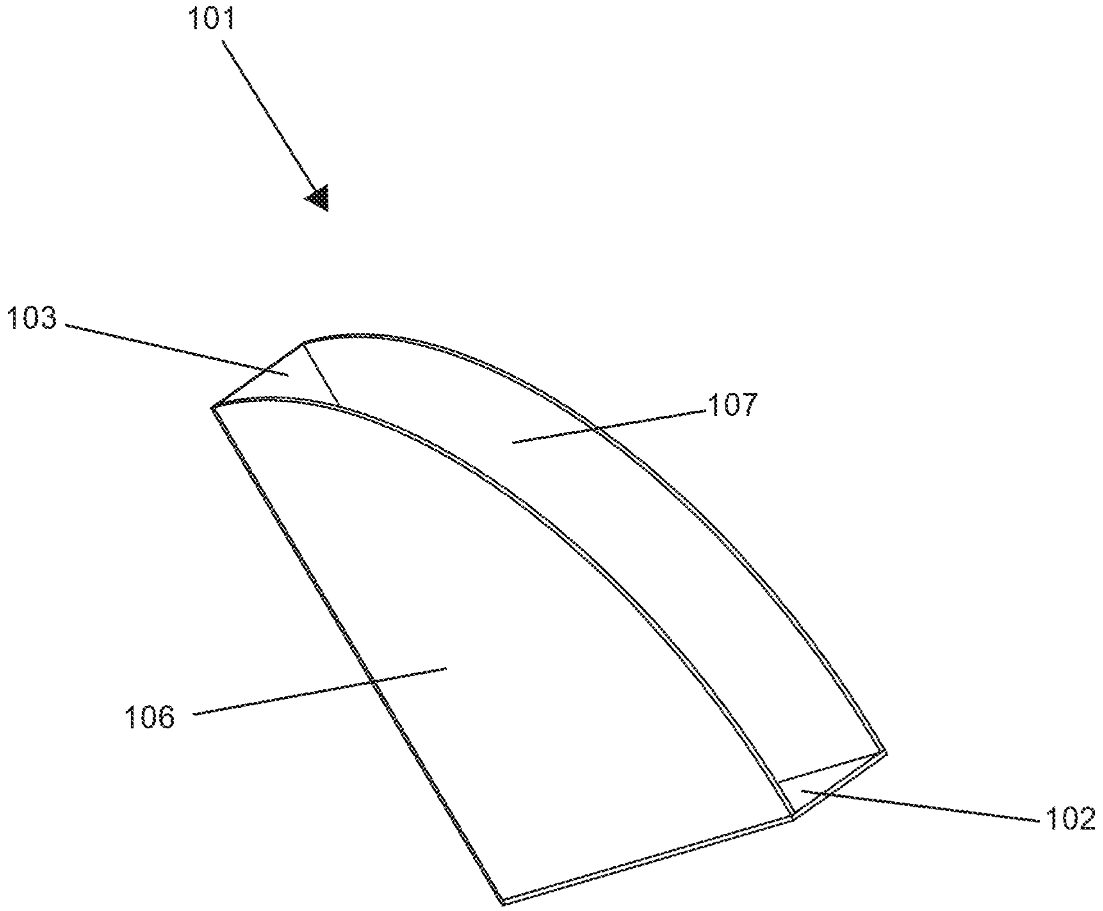
FIG. 1 illustrates an isometric view of the file insert of the present invention.

The best mode for carrying out the invention will be described herein. The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. To avoid obscuring the present invention, some well-known system configurations, and process steps are not disclosed in detail. The figures illustrating embodiments of the system, if any, are semi-diagrammatic and not to scale and, particularly, some of the dimensions are for the clarity of presentation and are shown exaggerated in the drawing figures.

Alternate embodiments have been included throughout, and the order of such are not intended to have any other significance or provide limitations for the present invention.

For expository purposes, the term "horizontal" as used herein is defined as a plane parallel to the plane or surface of the present apparatus, regardless of its orientation. The term "vertical" refers to a direction perpendicular to the horizontal as just defined. Terms, such as "above", "below", "bottom", "top", "side", "higher", "lower", "upper", "over", "under", "right side", and "left side" are defined with respect to the horizontal plane, as shown in the figures, if any. The term "on" means that there is direct contact among elements.

The term "paper" as used herein means any type of sheets of papers, envelopes, business cards, letters, folders, magazines, etc. Although the term "paper" is used throughout, other items may be substituted for "paper" for use in the present invention, such as plastic folders, rubber mats, desk accessories, etc.

The present invention provides a paper tray storage system that allows for flexibility of use. The paper tray storage system of the present invention allows for papers of various sizes to be stored properly, while allowing for expandability of storage and for removability of the file inserts (file compartments).

The present invention provides a paper storage system, comprising: a stand, wherein the stand comprises a series of vertical walls disposed on a base panel, wherein the series of vertical walls are each parallel to each other and are substantially at right angles to the base panel, wherein the series of vertical walls are different lengths such that the distal ends of the vertical walls form a substantially V shape; and at least one file insert, wherein each of the at least one file insert has two or more side panels attached to a second panel and a first panel to create one or more file compartments, and wherein each of the at least one file insert is removably disposed on the V shape created by the distal ends of the vertical walls of the stand.

The present invention further provides a paper storage system, wherein the side panels of each of the at least one file insert are curved; wherein one or both of the two vertical walls at both ends of the series of vertical walls contain a mechanism to removably attach to the at least one file insert; wherein the series of vertical walls disposed on the base panel of the stand form compartments; wherein the compartments are closed on the distal ends from the base panel; wherein the distal ends of the vertical walls each contain a mechanism to removably attach to each of the at least one file insert; wherein the at least one file insert is removably attachable to each other; wherein the second panel and the first panel of each of the at least one file insert are substantially the same length; and wherein each of the at least one file insert is attachably disposed on the V shape created by the distal ends of the vertical walls of the stand.

The present invention provides a paper storage system, comprising: a stand, wherein the stand comprises a series of vertical walls disposed on a base panel and the distal ends of the vertical walls form a substantially V shape; and at least one file insert, wherein the at least one file insert is removably disposed on the V shape created by the distal ends of the vertical walls of the stand.

The present invention further provides a paper storage system, wherein the series of vertical walls are each parallel to each other and are substantially at right angles to the base panel; wherein the at least one file insert comprises one or more file compartments; wherein each of the at least one file insert has two or more side panels attached to a second panel and a first panel to create one or more file compartments; wherein the at least one file insert is removably attachable to each other; wherein the side panels of the at least one file insert are curved; and wherein the at least one file insert is attachably disposed on the V shape created by the distal ends of the vertical walls of the stand.

FIG. 1 shows an isometric view of file insert 101. File insert 101 is connectably removably attachable to one or more other file insert(s) 101.

File insert 101 comprises side panels 106 and 107, first panel 102, and second panel 103, to form a file compartment. Side panels 106 and 107 are both attached to second panel 103 and first panel 102 to form file insert 101.

First panel 102 and second panel 103 are connected to each other at their distal ends at a substantially 90 degree angle. Side panels 106 and 107 each have two edges that are substantially straight and meet to create a 90 degree corner. The two edges of side panel 106 that meet to create the 90 degree corner are attached to the left side of the edges of the sides of first panel 102 and second panel 103, and the two edges of side panel 107 that meet to create the 90 degree corner are attached to the right side of the edges of the sides of first panel 102 and second panel 103. This creates file insert 101 which allows for paper and other items to be placed in file insert 101. The terms "left side" and "right side" mean the edges of first panel 102 and second panel 103 as shown in the orientation in FIG. 1, with side panel 106 being on the left side of FIG. 1.

As shown in FIG. 1, in the preferred embodiment, side panels 106 and 107 have curved edges opposite the 90 degree corner.

The dimensions of any of the pieces of file insert 101 can be varied according to the desired usage. First panel 102, second panel 103, and side panels 106 and 107 form the file insert 101 such that there is a 90 degree corner in the interior of file insert 101. More than two side panels may be present in file insert 101 to form multiple file compartments. Additional side panels are attached to first panel 102 and second panel 103 in the same manner as side panels 106 and 107.

The curved edges allow for paper and other materials to be more easily grabbed by a user when the paper and other materials are in file insert 101.

First panel 102 and second panel 103 may be substituted the same length, or they may be different (as in a standard piece of paper). The lengths of the sides of side panels 106 and 107 correspond to the lengths of first panel 102 and second panel 103, accordingly.

Figure 2:
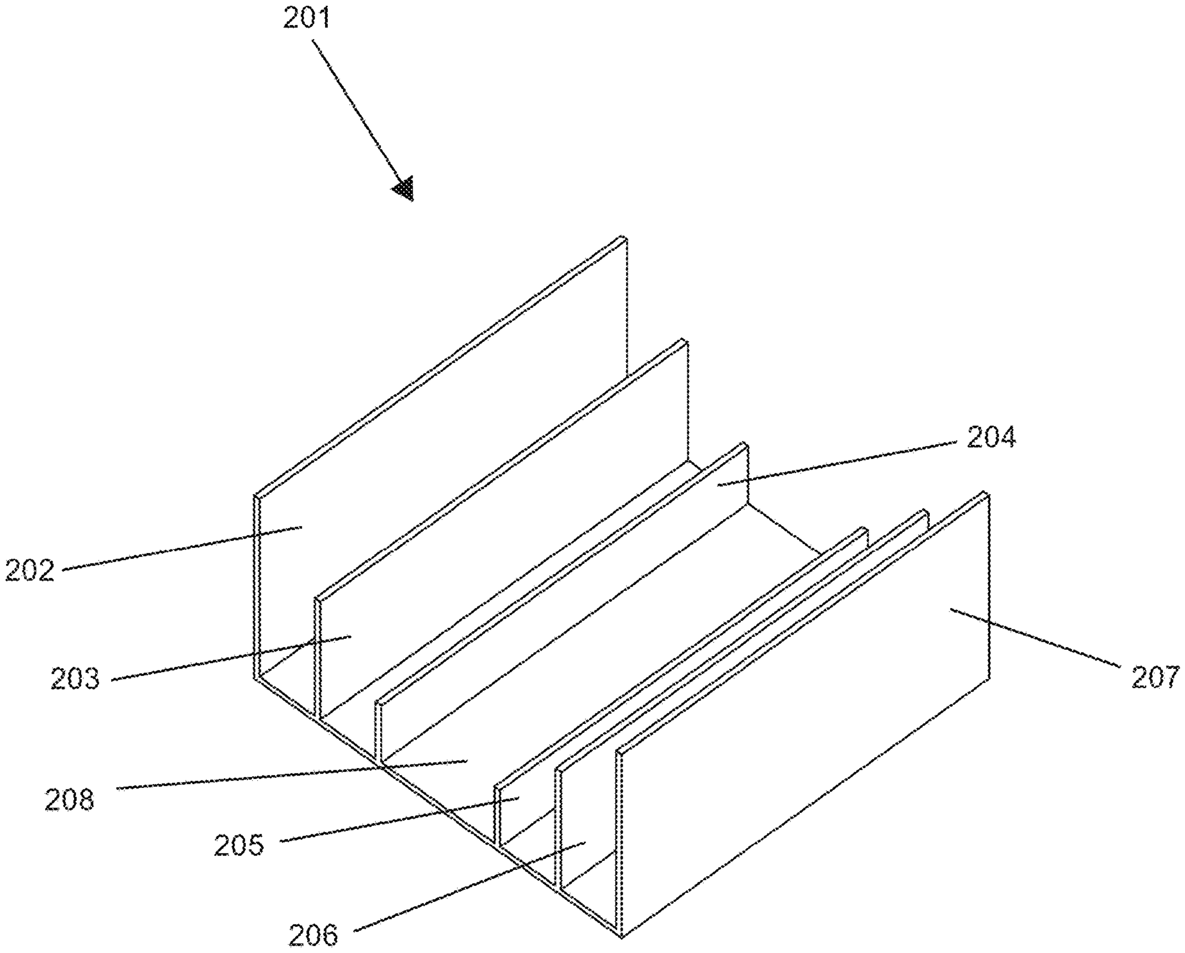
FIG. 2 illustrates an isometric view of the stand of the present invention.

FIG. 2 shows an isometric view of stand 201. Stand 201 comprises vertical walls 202, 203, 204, 205, 206, and 207, which are disposed on stand base panel 208 at approximately 90 degree angles extending outward. The distal ends of vertical walls 202, 203, 204, 205, 206, and 207 vary such that they form a V shape. Vertical walls 202 and 207 are substantially the same length, vertical walls 203 and 206 are substantially the same length, and vertical walls 204 and 205 are substantially the same length. Vertical walls 202 and 207 are longer than vertical walls 203 and 206, and vertical walls 203 and 206 are longer than vertical walls 204 and 205.

The term 'V shape' as it is used herein refers to a shape that has a substantially 90 degree corner and is in the position of a 'V', meaning the corner of the shape is at the bottom. As such, file inert 101 is substantially a 'V shape'.

Although only six vertical walls, being three sets of vertical walls that have corresponding lengths, are shown, any number of vertical walls may be present.

The space in between of vertical walls 202, 203, 204, 205, 206, and 207 creates compartments.

A V shaped piece, or otherwise, may be disposed in the V shape in order to enclose the compartments at the top, or the compartments may be open at the top, as shown in FIG. 2.

Figure 3:
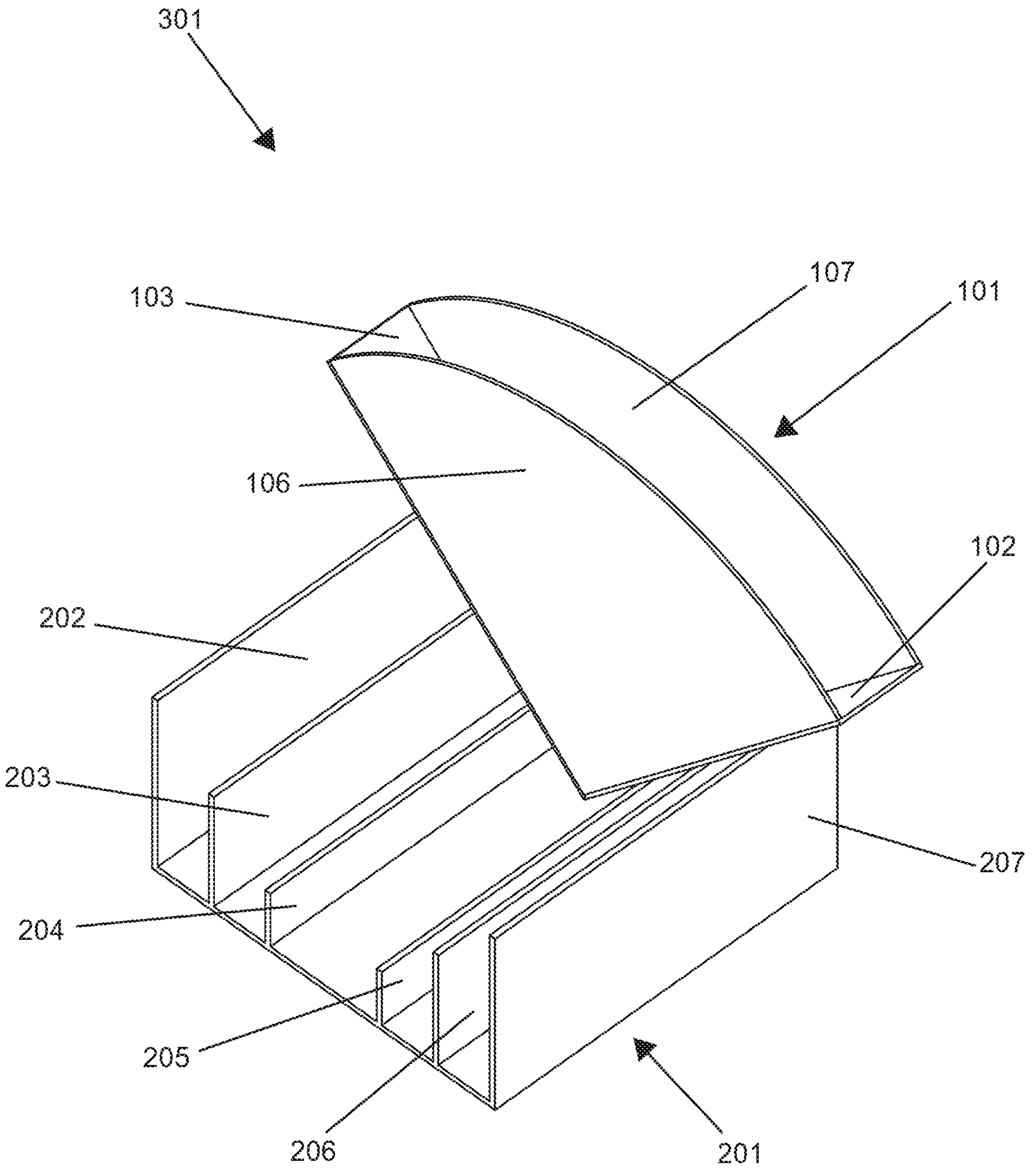
FIG. 3 illustrates an isometric view of the file insert disposed on the stand to form the paper tray storage system of the present invention.

FIG. 3 shows file insert 101 disposed on stand 201 to form paper tray storage system 301. File insert 101 may sit in the V shape of stand 201 that is formed by the distal ends of vertical walls 202, 203, 204, 205, 206, and 207, or be connectably, attachably, and/or removably attached via any suitable means, such as hooks, clasps, buttons, etc.

The lengths of vertical walls 202, 203, 204, 205, 206, and 207 correspond to the shape of file insert 101 such that file insert 101 is in contact with the distal ends of each of vertical walls 202, 203, 204, 205, 206, and 207.

Paper tray storage system 301 comprising file insert 101 disposed on stand 201 allows for papers of various sizes to be stored properly, while allowing for expandability of storage. Multiple file inserts 101 may be utilized depending on the size of storage desired by the user. File insert 101 is easily removed from stand 201 and is portable.

The compartments created between the vertical walls 202, 203, 204, 205, 206, and 207 creates storage for smaller pieces of paper such as envelopes, business cards, letters, etc., along with non-paper items such as pens, pencils, etc.

File insert 101 is ideally sized such that it contains standard sized paper, with the paper jutting out past the curved edges of side panels 106 and 107. This allows for easy access to the papers. Additionally, file insert 101 can easily be removed from stand 201 and taken on the go.

Figure 4:
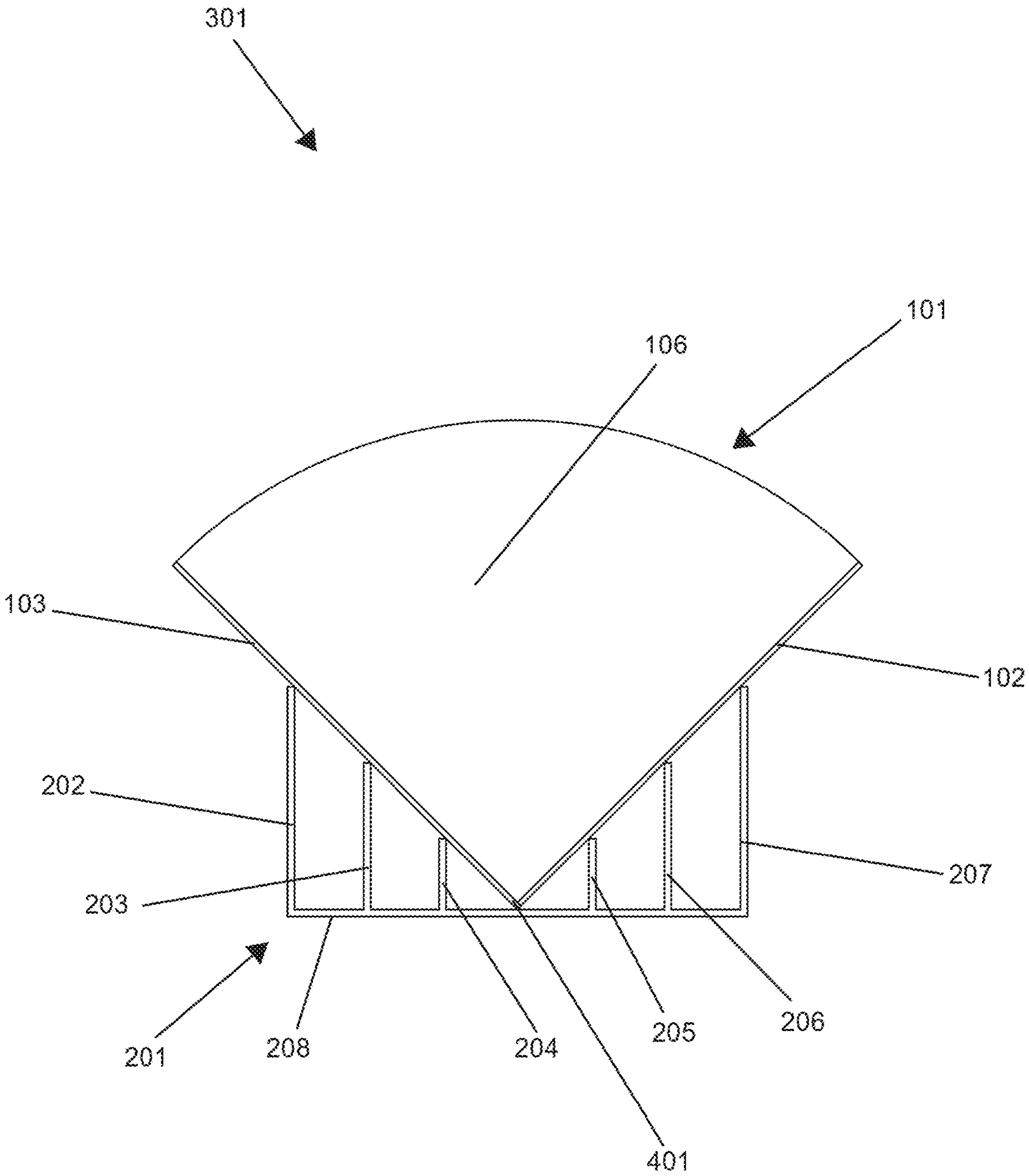
FIG. 4 illustrates a side elevation view of the file insert disposed on the stand to form the paper tray storage system of the present invention.

FIG. 4 shows a side elevation view of file insert 101 disposed on stand 201. As shown, file insert 101 is in contact with the distal ends of each of vertical walls 202, 203, 204, 205, 206, and 207. First panel 102 and second panel 103 meet at connection 401. Connection 401 may or may not be in contact with stand base panel 208 when file insert 101 is disposed on stand 201.

Figure 5:
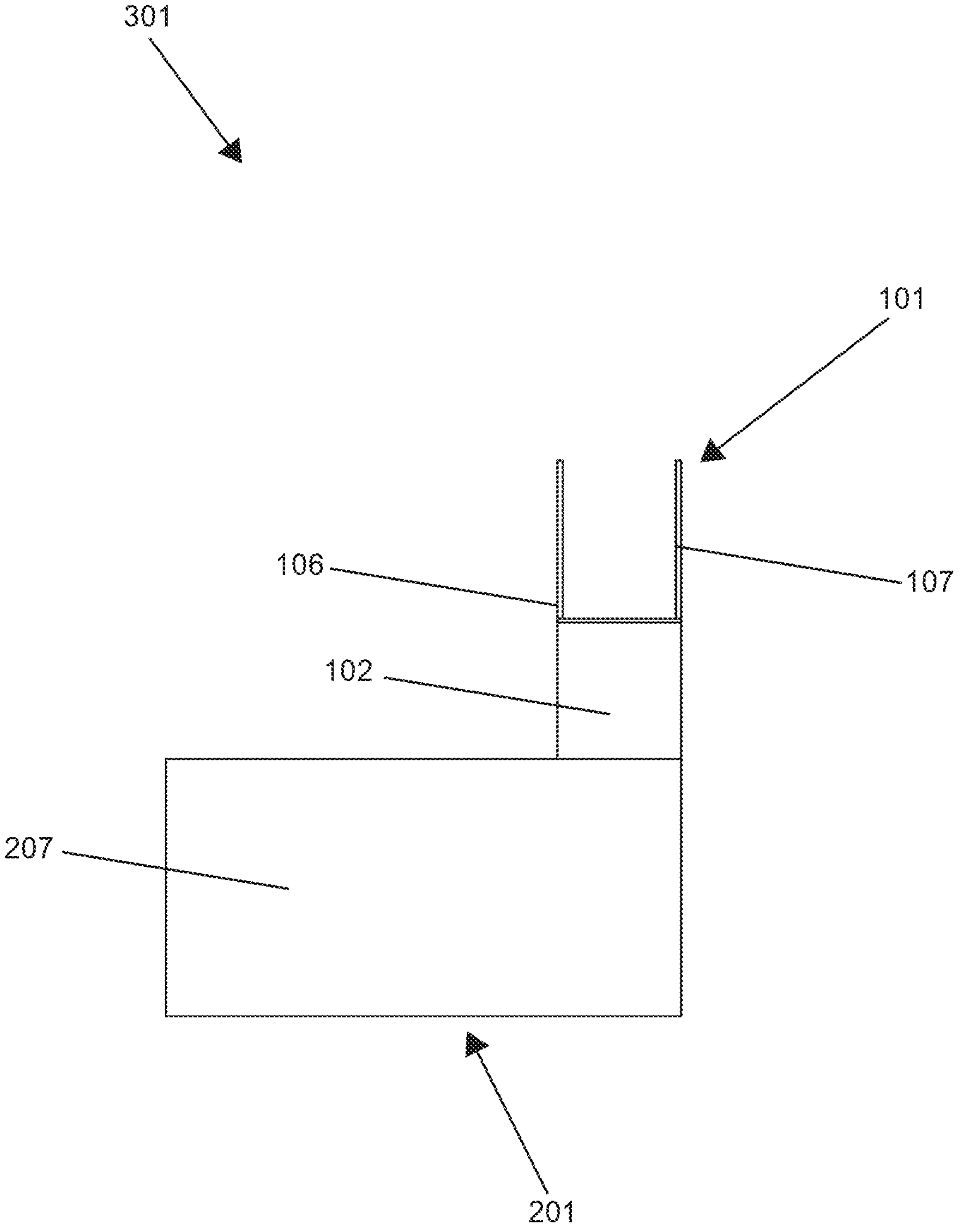
FIG. 5 illustrates a front elevation view of the file insert disposed on the stand to form the paper tray storage system of the present invention.

FIG. 5 shows a front elevation view of file insert 101 disposed on stand 201 to form paper tray storage system 301. The curved edges of side panels 106 and 107 extend beyond first panel 102 and second panel 103 (not visible in this FIG.).

Figure 6:
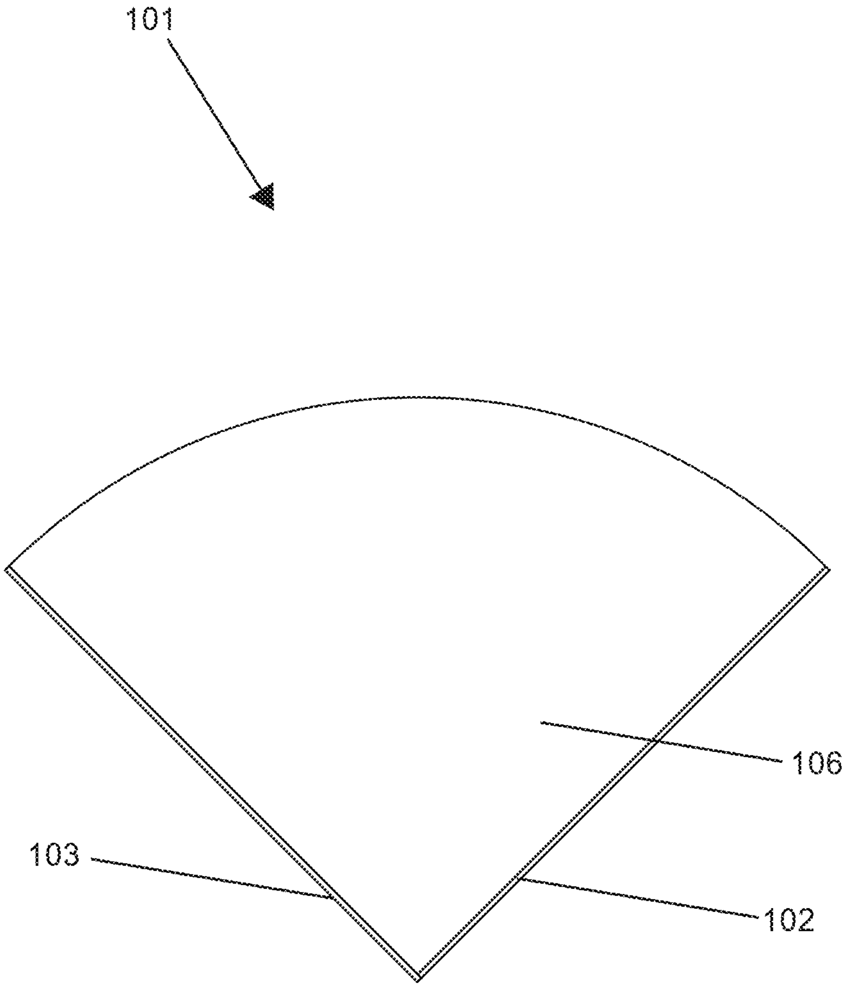
FIG. 6 illustrates a side elevation view of the file insert of the present invention.

FIG. 6 shows a side elevation view of file insert 101.

Figure 7:
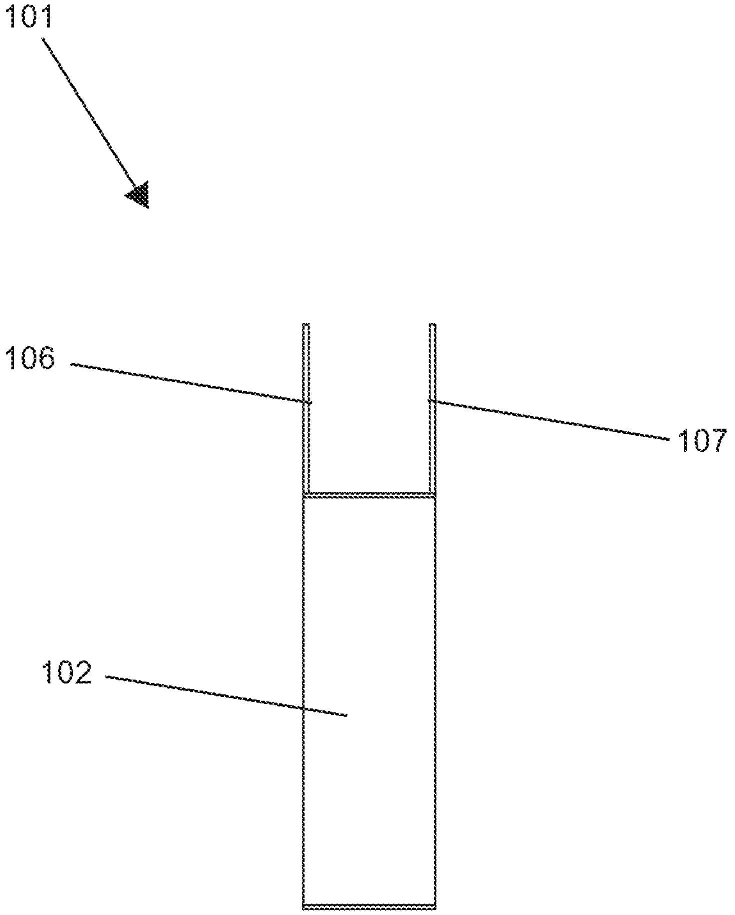
FIG. 7 illustrates a front elevation view of the file insert of the present invention.

FIG. 7 shows a front elevation view of file insert 101.

Figure 8:
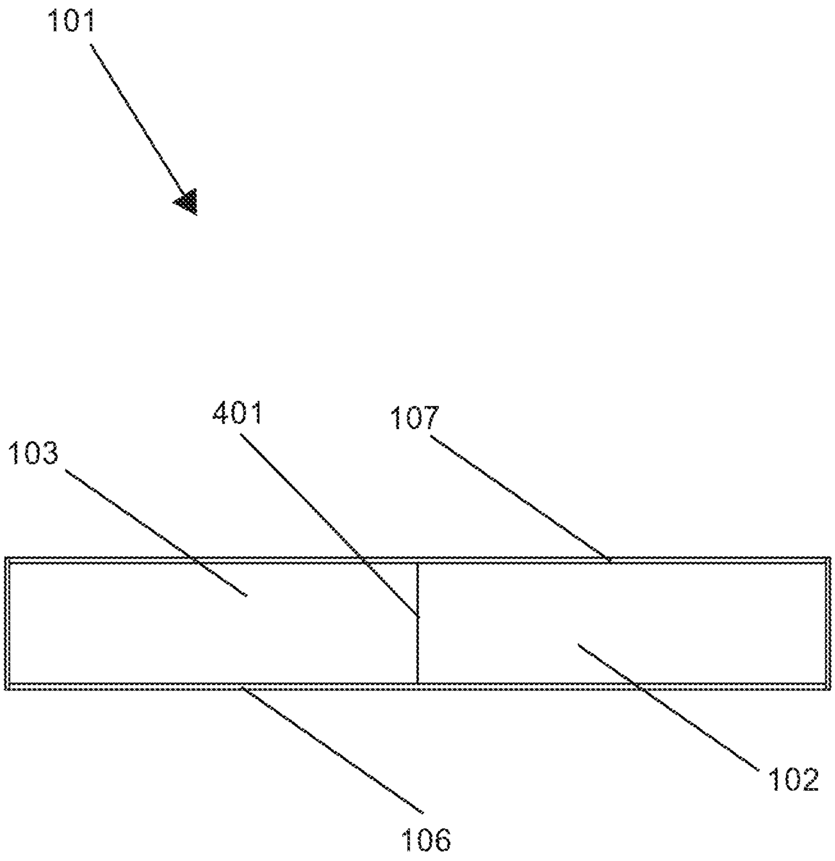
FIG. 8 illustrates a top down view of the file insert of the present invention.

FIG. 8 shows a top down view of file insert 101.

Figure 9:
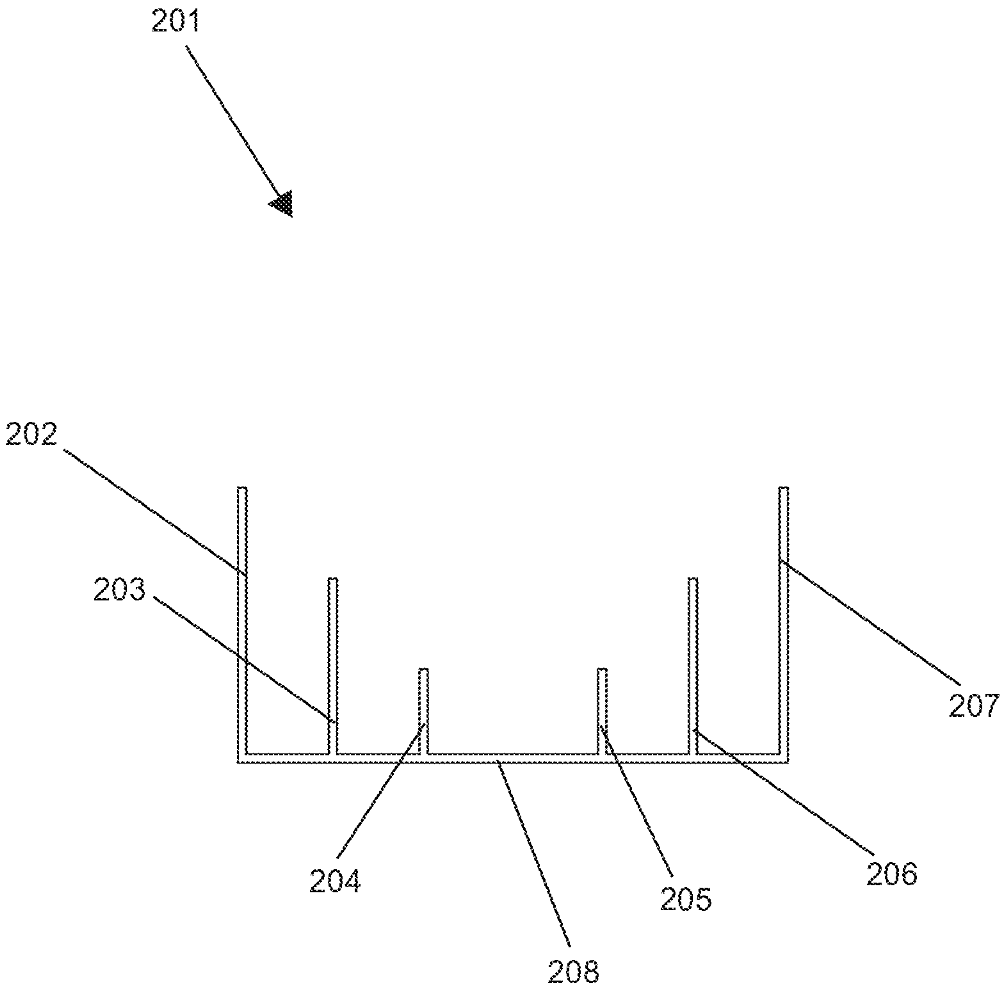
FIG. 9 illustrates a side elevation view of the stand of the present invention.

FIG. 9 shows a side elevation view of the stand 201. Vertical walls 202, 203, 204, 205, 206, and 207 may be spaced in any way as desired.

Figure 10:
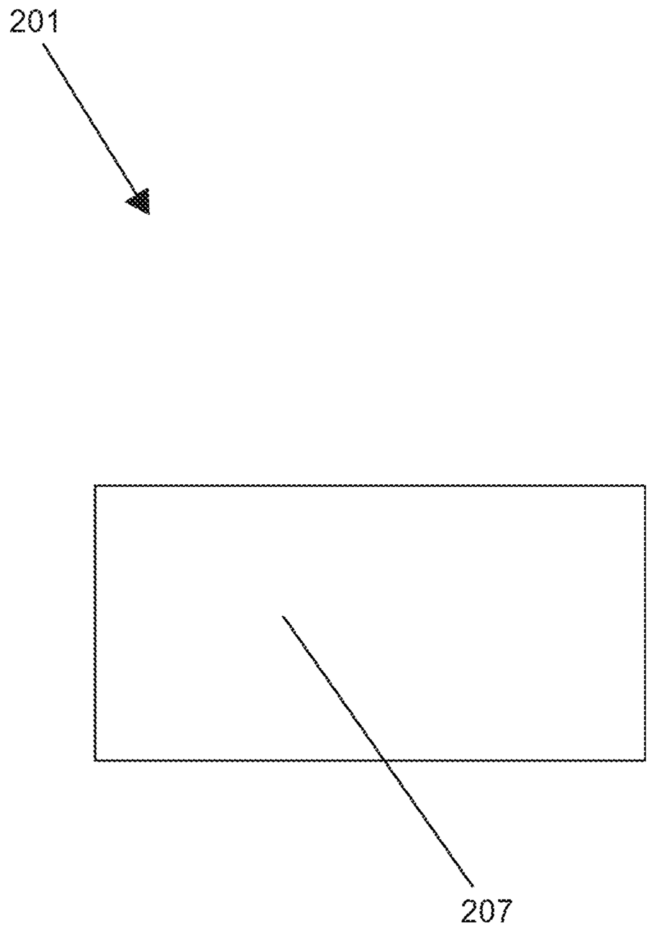
FIG. 10 illustrates a front elevation view of the stand of the present invention.

FIG. 10 shows a front elevation view of the stand 201.

Figure 11:
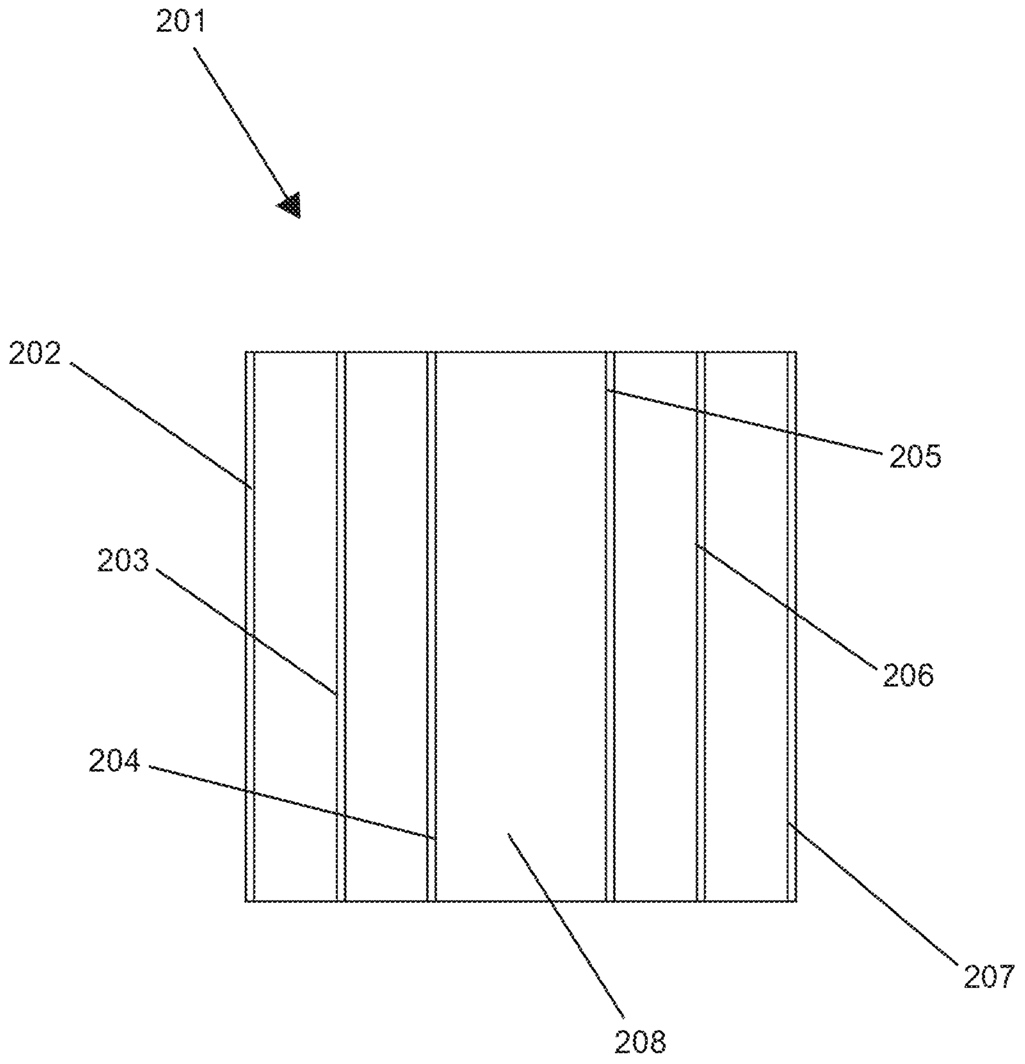
FIG. 11 illustrates a top down view of the stand of the present invention.

FIG. 11 shows a top down view of the stand 201.

Figure 12:
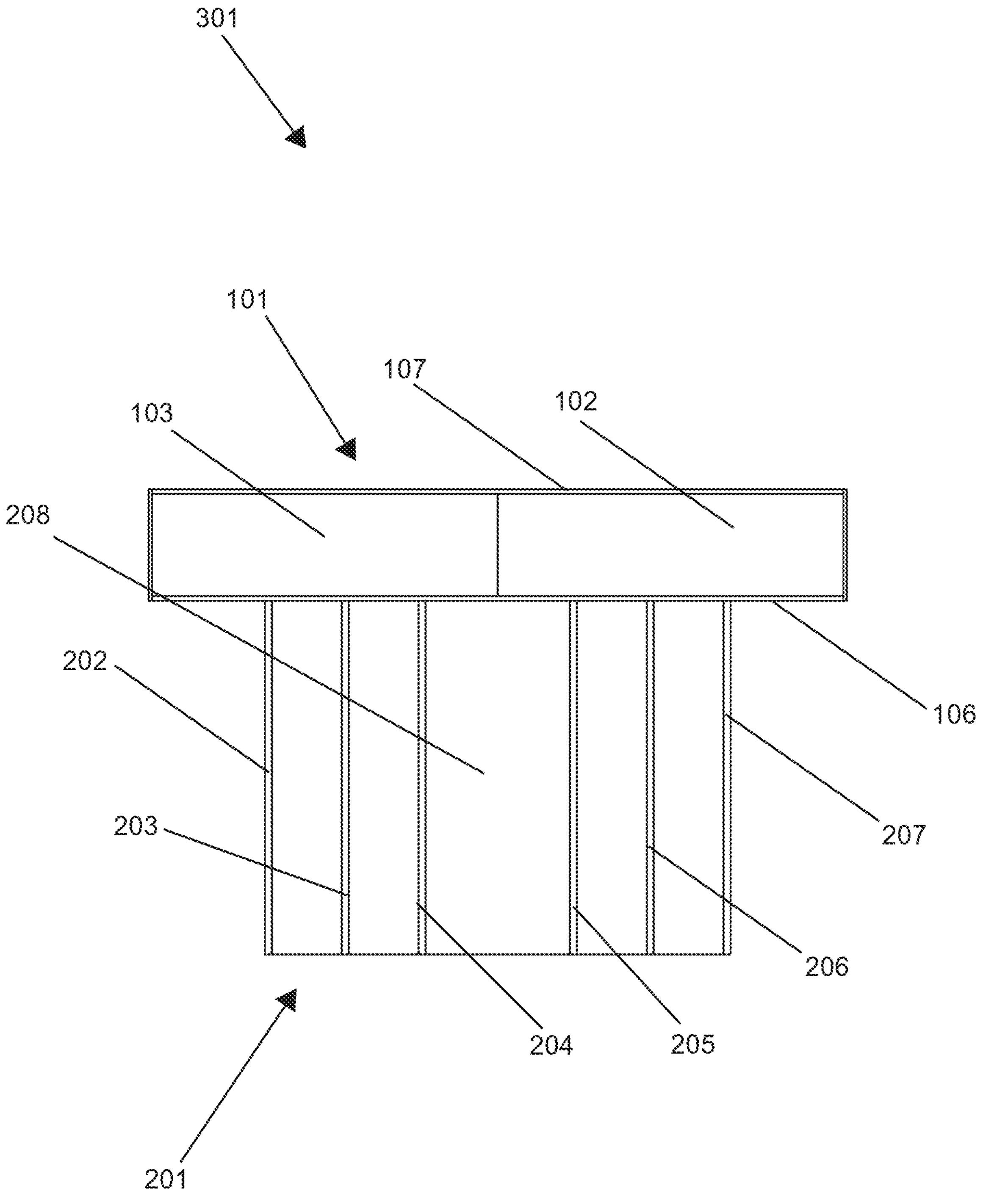
FIG. 12 illustrates a top down view of the file insert disposed on the stand to form the paper tray storage system of the present invention.

FIG. 12 shows a top down view of file insert 101 disposed on stand 201 to form paper tray storage system 301.

Figure 13:
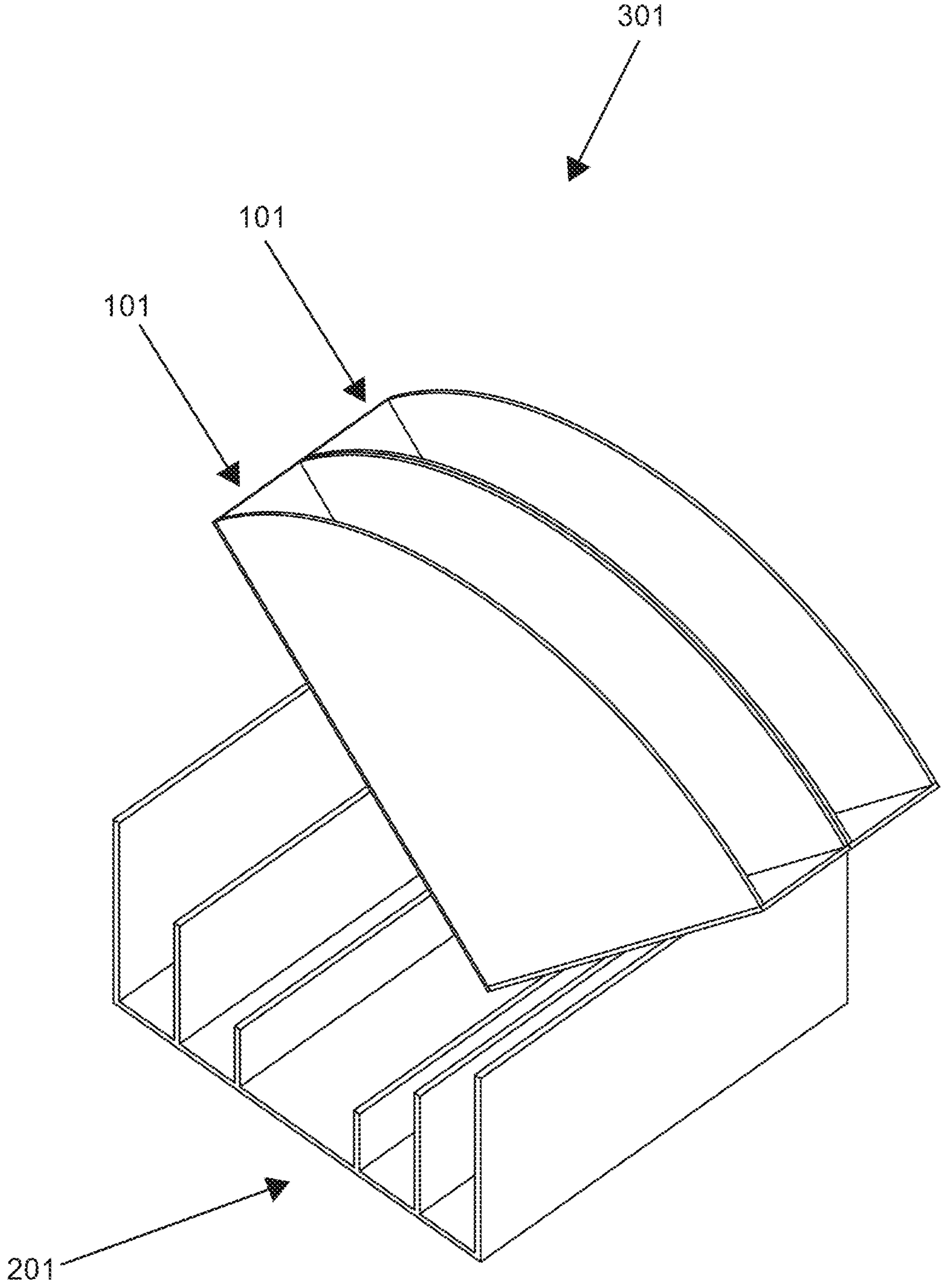
FIG. 13 illustrates an isometric view of two file insert disposed on the stand to form the paper tray storage system of the present invention.

FIG. 13 shows an isometric view of two file inserts 101 disposed on stand 201 to form paper tray storage system 301. As many file inserts 101 may be disposed on stand 201 as desired. Each file insert 101 may be connectably removably attachable to other file inserts 101 by any means.

Figure 14:
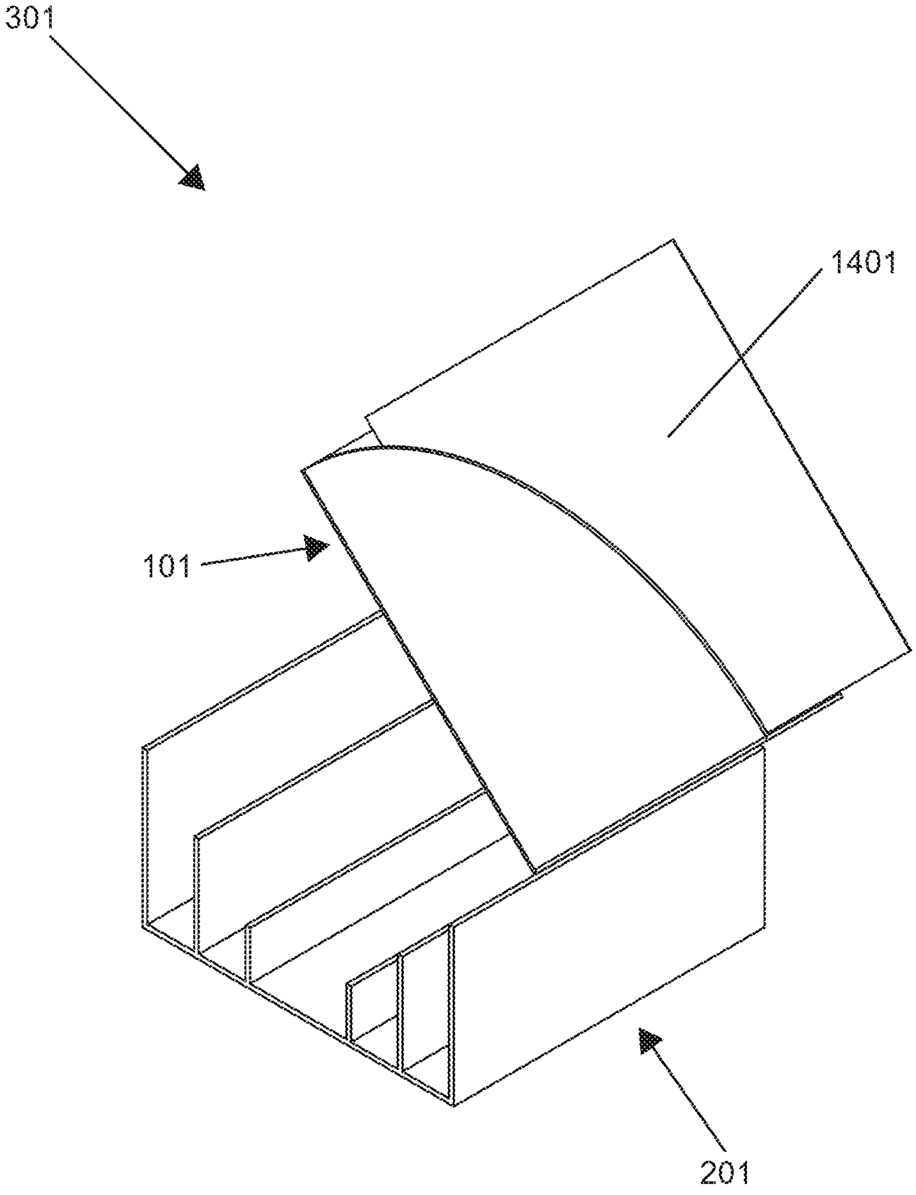
FIG. 14 illustrates an isometric view of the file insert disposed on the stand to form the paper tray storage system of the present invention in use with paper in file insert.

FIG. 14 shows an isometric view of file insert 101 disposed on stand 201 to form paper tray storage system 301 in use with paper 1401 in file insert 101.

Figure 15:
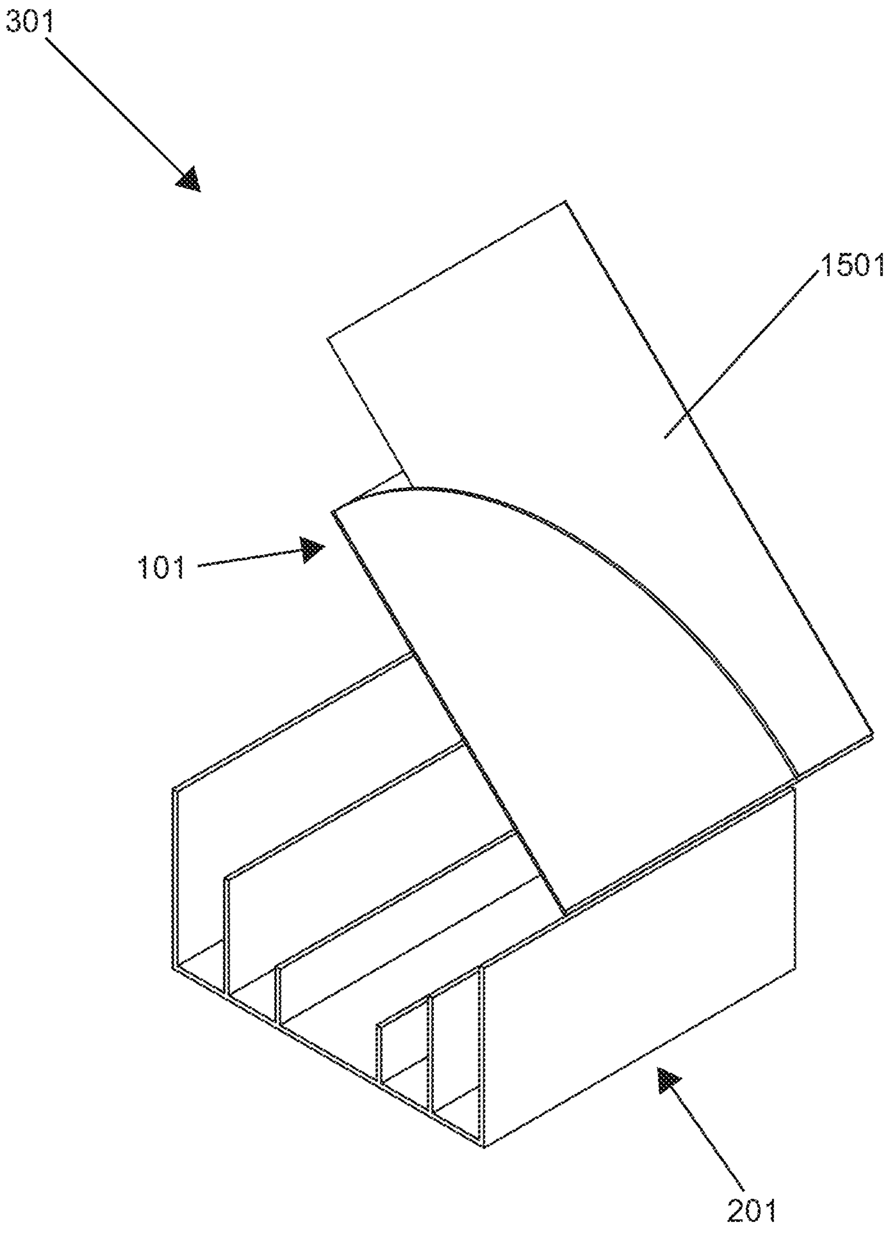
FIG. 15 illustrates an isometric view of the file insert disposed on the stand to form the paper tray storage system of the present invention in use with paper in file insert.

FIG. 15 shows an isometric view of file insert 101 disposed on stand 201 to form paper tray storage system 301 in use with paper 1501 in file insert 101.

Figure 16:
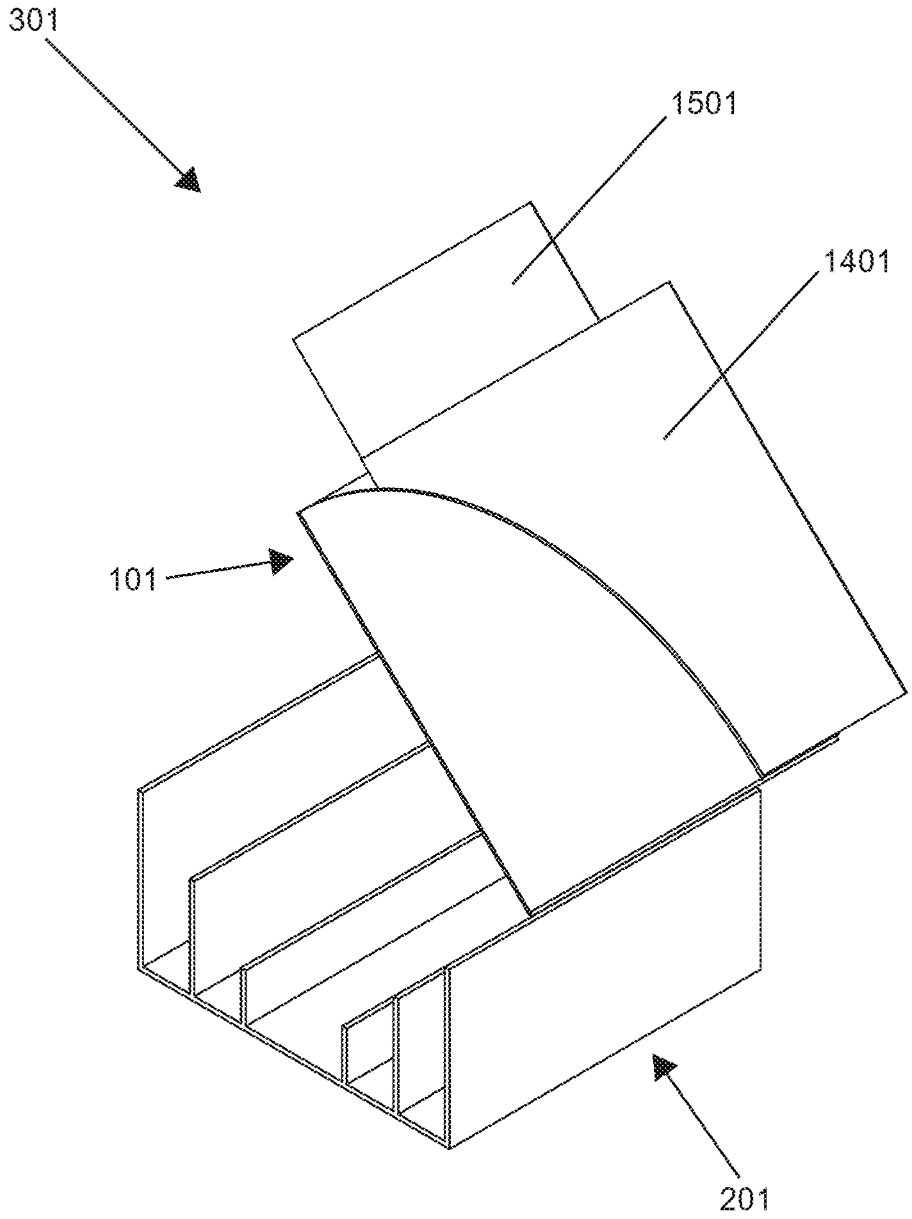
FIG. 16 illustrates an isometric view of the file insert disposed on the stand to form the paper tray storage system of the present invention in use with paper in file insert.

FIG. 16 shows an isometric view of file insert 101 disposed on stand 201 to form paper tray storage system 301 in use with papers 1401 and 1501 in file insert 101. Papers 1401 and 1501, as shown in FIGS. 14-16 may be any papers of any size or shape. As shown in FIGS. 14-16, papers 1401 and 1501 extend past curved edges of side panels 106 and 107 (not numbered in these FIGS.) to allow for easy access.

The best mode for carrying out the invention has been described herein. The previous embodiments are described in sufficient detail to enable those skilled in the art to make and use the invention. It is to be understood that other embodiments would be evident based on the present disclosure, and that system, process, or mechanical changes may be made without departing from the scope of the present invention.

In the previous description, numerous specific details and examples are given to provide a thorough understanding of the invention. However, it will be apparent that the invention may be practiced without these specific details and specific examples. While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters previously set forth herein or shown in the accompanying figures are to be interpreted in an illustrative and non-limiting sense.

What is claimed is:

1. A paper storage system, comprising:

a stand, wherein the stand comprises a series of vertical walls disposed on a base panel, wherein a first set of corresponding vertical walls of the series of vertical walls is longer than one or more additional sets of corresponding vertical walls of the series of vertical walls, wherein the first set of corresponding vertical walls are at a left end of the base panel and a right end of the base panel, wherein the series of vertical walls are each parallel to each other and are substantially at right angles to the base panel, wherein the one or more additional sets of corresponding vertical walls are disposed on the stand in between the first set of corresponding vertical walls, wherein the series of vertical walls are different lengths such that distal ends of the vertical walls form a V shape; and at least one file insert, wherein each of the at least one file insert has two or more side panels attached to a second panel and a first panel to create one or more file compartments, and wherein each of the at least one file insert is removably disposed on the V shape created by the distal ends of the vertical walls of the stand.

2. The paper storage system of claim 1, wherein the two or more side panels of each of the at least one file insert are curved.

3. The paper storage system of claim 1, wherein one or both of two vertical walls at both ends of the series of the vertical walls are removably attached to the at least one file insert.

4. The paper storage system of claim 1, wherein the series of vertical walls form compartments.

5. The paper storage system of claim 4, wherein the formed compartments are closed on the distal ends from the base panel.

6. The paper storage system of claim 1, wherein the distal ends of the vertical walls are removably attached to each of the at least one file insert.

7. The paper storage system of claim 1, wherein the at least one file insert is removably attachable to each other.

8. The paper storage system of claim 1, wherein the second panel and the first panel of each of the at least one file insert are substantially the same length.

9. The paper storage system of claim 1, wherein each of the at least one file insert is attachably disposed on the V shape created by the distal ends of the vertical walls of the stand.

10. A paper storage system, comprising:

a stand, wherein the stand comprises a series of vertical walls disposed on a base panel, wherein a first set of corresponding vertical walls of the series of vertical walls is longer than one or more additional sets of corresponding vertical walls of the series of vertical walls, wherein the first set of corresponding vertical walls are at a left end of the base panel and a right end of the base panel, wherein the one or more additional sets of corresponding vertical walls are disposed on the stand in between the first set of corresponding vertical walls wherein distal ends of the series of the vertical walls form a V shape; and at least one file insert, wherein the at least one file insert is removably disposed on the V shape created by the distal ends of the vertical walls of the stand.

11. The paper storage system of claim 10, wherein the series of the vertical walls are each parallel to each other and are substantially at right angles to the base panel.

12. The paper storage system of claim 10, wherein the at least one file insert comprises one or more file compartments.

13. The paper storage system of claim 10, wherein each of the at least one file insert has two or more side panels attached to a second panel and a first panel to create one or more file compartments.

14. The paper storage system of claim 10, wherein the at least one file insert is removably attachable to each other.

15. The paper storage system of claim 10, wherein side panels of the at least one file insert are curved.

16. The paper storage system of claim 10, wherein the at least one file insert is attachably disposed on the V shape created by the distal ends of the vertical walls of the stand.

* * * * *